(12) United States Patent
Yamauchi

(10) Patent No.: US 10,995,296 B2
(45) Date of Patent: May 4, 2021

(54) SLIDING MEMBER

(71) Applicant: DAIDO METAL COMPANY LTD., Nagoya (JP)

(72) Inventor: Takayoshi Yamauchi, Inuyama (JP)

(73) Assignee: DAIDO METAL COMPANY LTD., Nagoya (JP)

(*) Notice: Subject to any disclaimer, the term of this patent is extended or adjusted under 35 U.S.C. 154(b) by 428 days.

(21) Appl. No.: 15/432,439

(22) Filed: Feb. 14, 2017

(65) Prior Publication Data
US 2017/0233671 A1 Aug. 17, 2017

(30) Foreign Application Priority Data

Feb. 15, 2016 (JP) .............................. JP2016-025929

(51) Int. Cl.
*C10M 125/02* (2006.01)
*C10M 103/02* (2006.01)
(Continued)

(52) U.S. Cl.
CPC ........ *C10M 125/02* (2013.01); *C10M 103/02* (2013.01); *C10M 107/44* (2013.01);
(Continued)

(58) Field of Classification Search
CPC .............. C10M 125/02; C10M 103/02; C10M 113/02; C10M 125/08; C10M 125/10;
(Continued)

(56) References Cited

U.S. PATENT DOCUMENTS

| 4,898,905 A * | 2/1990 | Kawakami | ........... | C08K 3/0008 |
| | | | | 524/404 |
| 2013/0116157 A1* | 5/2013 | Mukai | ..................... | C08G 73/10 |
| | | | | 508/108 |

FOREIGN PATENT DOCUMENTS

| EP | 2770211 A1 * | 8/2014 | .......... C10M 147/02 |
| EP | 2770211 A1 | 8/2014 | |

(Continued)

OTHER PUBLICATIONS

Office Action dated Aug. 8, 2017 in corresponding Japanese patent application No. 2016-025929 (in Japanese).
(Continued)

*Primary Examiner* — James C Goloboy
(74) *Attorney, Agent, or Firm* — Snyder, Clark, Lesch & Chung, LLP

(57) ABSTRACT

A sliding member includes a back metal layer and a sliding layer on the back metal layer. The sliding layer includes a synthetic resin matrix and graphite particles dispersed in the matrix in a volume ratio of 5-50% of that of the sliding layer. The graphite particles are composed of spheroidal and flake-like particles. The flake-like particles have a volume ratio of 10-40% of total graphite particles. The spheroidal particles have a cross-sectional structure with a plurality of AB planes of a graphite crystal laminated along a curved particle surface, from the surface toward a center direction. The flake-like graphite particles have a cross-sectional structure with the plurality of AB planes laminated in a thickness direction of the thin plate shape. The spheroidal particles have an average particle size of 3-50 μm, and the flake-like graphite particles have an average particle size of 1-25 μm.

5 Claims, 2 Drawing Sheets

(51) Int. Cl.
  *C10M 125/08* (2006.01)
  *F16C 33/10* (2006.01)
  *C10M 125/24* (2006.01)
  *F16C 33/16* (2006.01)
  *F16C 33/12* (2006.01)
  *C10M 125/18* (2006.01)
  *C10M 113/02* (2006.01)
  *C10M 125/30* (2006.01)
  *C10M 107/44* (2006.01)
  *C10M 125/10* (2006.01)
  *C10M 125/22* (2006.01)
  *C10N 20/06* (2006.01)
  *C10N 50/08* (2006.01)
  *C10N 50/00* (2006.01)
  *C10M 147/02* (2006.01)

(52) U.S. Cl.
  CPC ........ *C10M 113/02* (2013.01); *C10M 125/08* (2013.01); *C10M 125/10* (2013.01); *C10M 125/18* (2013.01); *C10M 125/22* (2013.01); *C10M 125/24* (2013.01); *C10M 125/30* (2013.01); *F16C 33/1095* (2013.01); *F16C 33/121* (2013.01); *F16C 33/16* (2013.01); *C10M 147/02* (2013.01); *C10M 2201/041* (2013.01); *C10M 2201/061* (2013.01); *C10M 2201/062* (2013.01); *C10M 2201/065* (2013.01); *C10M 2201/066* (2013.01); *C10M 2201/081* (2013.01); *C10M 2201/085* (2013.01); *C10M 2201/103* (2013.01); *C10M 2209/1003* (2013.01); *C10M 2209/1023* (2013.01); *C10M 2209/1033* (2013.01); *C10M 2213/02* (2013.01); *C10M 2213/062* (2013.01); *C10M 2217/0415* (2013.01); *C10M 2217/0443* (2013.01); *C10M 2221/0405* (2013.01); *C10N 2020/06* (2013.01); *C10N 2050/08* (2013.01); *C10N 2050/14* (2020.05); *F16C 2208/02* (2013.01)

(58) Field of Classification Search
  CPC .............. C10M 125/18; C10M 125/22; C10M 147/02; C10M 2201/041; C10M 2201/061; C10M 2201/062; C10M 2201/065; C10M 2201/066; C10M 2201/081; C10M 2201/085; C10M 2201/103; C10M 2209/1003; C10M 2209/1023; C10M 2209/1033; C10M 2213/02; C10M 2213/062; C10M 2217/0415; C10M 2217/0443; C10M 2221/0405; C10N 2010/06; C10N 2050/08; C10N 2050/14; F16C 33/1095; F16C 33/121; F16C 33/16; F16C 2208/02
  See application file for complete search history.

(56) References Cited

FOREIGN PATENT DOCUMENTS

| | | |
|---|---|---|
| JP | H0671810 A | 3/1994 |
| JP | H06341438 A | 12/1994 |
| JP | H07228774 A | 8/1995 |
| JP | H09295867 A | 11/1997 |
| JP | 2002348110 A | 12/2002 |
| JP | 2003238135 A | 8/2003 |
| JP | 2005-089514 | 4/2005 |
| JP | 2007169461 A | 7/2007 |
| JP | 2008-024588 | 2/2008 |
| JP | 2010052385 A | 3/2010 |
| JP | 2013083301 A | 5/2013 |
| WO | WO 2012/074107 | 6/2012 |
| WO | WO 2012/137770 | 10/2012 |

OTHER PUBLICATIONS

Extended European Search Report dated Jun. 23, 2017 in corresponding EP Application No. 17156100.4.

* cited by examiner

SLIDING MEMBER

CROSS-REFERENCE TO RELATED APPLICATION

This application is based on and claims the benefit of priority from Japanese Patent Application No. 2016-025929 filed on Feb. 15, 2016. The entire disclosure of the above application is incorporated herein by reference.

FIELD OF THE INVENTION

The present invention relates to a sliding member, and specifically relates to a sliding member including a back metal layer and a sliding layer including synthetic resin and graphite.

BACKGROUND OF THE INVENTION

A sliding member has been conventionally used, which includes a resin composition added with graphite flakes, as a solid lubricant, in a synthetic resin matrix (see JP-A-2005-089514). In general, natural graphite is classified to flake graphite, vein graphite, and amorphous graphite according to their properties. The vein graphite has the highest graphitization degree of 100%. The flake graphite has the graphitization degree of 99.9%, and the amorphous graphite has the low graphitization degree of 28%. Conventionally, the natural graphite of the vein or flake graphite having the high graphitization degree has been mechanically grinded to produce flake-like particles to be used as a solid lubricant of a sliding member.

The flake-like shaped graphite has a crystal structure including a large number of laminated AB planes (hexagonal net planes, or basal surfaces) where carbon atoms form a net structure regularly and extend in a planar shape, and defining a thickness in C-axis direction which is perpendicular to the AB plane. A bonding strength, by van der Waals force, is much weak between the laminated AB planes compared with an in-plane direction of the AB plane. Thus, shearing easily occurs between the AB planes. Accordingly, this graphite has a smaller thickness of the lamination in comparison with the extension of the AB plane, and thus the graphite generally has a thin plate shape. The flake-like graphite particles function as a solid lubricant since the shearing occurs between the AB planes when an external force is applied thereto.

In recent years, there is a problem that flake-like graphite particles break and drop off from a sliding member having a resin composition including the flake-like graphite particles, when a surface of the resin composition, which forms a sliding surface, is subjected to machining, since the flake-like graphite particles have a thin plate shape and are brittle. In the case, the sliding layer has a larger surface roughness, resulting in deterioration of seizure resistance. In order to solve the problem, WO 2012/074107, for example, proposes a sliding material including spherical natural graphite particles in a synthetic resin to improve a surface roughness after the machining.

The spherical graphite particles are produced by repeatedly applying a small load on the natural flake-like graphite particles as a raw material for bending them, and thereby granulating them to have a spherical shape (see WO 2012/137770 or JP-A-2008-024588).

SUMMARY OF THE INVENTION

An air conditioner is often left out of operation for a long time period. In the case, a compressor for the air conditioner is not also operated for a long time period. When the compressor starts-up after such a long time period of stoppage, there is no oil between a sliding surface of a sliding member of a bearing and a shaft surface in the compressor, and oil feeding to the bearing is insufficient for some time after the start-up. Therefore, the sliding surface of the sliding member and the surface of the counterpart shaft directly contact with each other during sliding.

In the sliding member, as shown in WO 2012/074107, having a resin composition including a spherical graphite particles, produced by spheroidizing natural graphite, in a synthetic resin, there is a problem that a surface of a counterpart shaft is easily scratched that leads to generation of wear, when the sliding member used for a bearing is subject to insufficient oil feeding at a time of start-up of a system such as a compressor of an air conditioner.

In addition, it has been found that the sliding member of WO 2012/074107 is subject to cracking of the graphite particles exposed to a sliding surface during sliding, when it is used for the bearing supporting a variable load, such as a load in the compressor of the air conditioner. In the case, the cracked graphite particles drop off from the sliding surface, and thus a sliding performance deteriorates.

Therefore, an object of the present invention is to overcome the problems of the prior arts, and to provide a sliding member that hardly generate scratches or flaws on a surface of a counterpart shaft even when oil feeding is insufficient immediately after start of the sliding as well as at the time of normal use.

According to an aspect of the present invention, provided is a sliding member including a back metal layer and a sliding layer on the back metal layer. The sliding layer includes a synthetic resin and graphite particles dispersed in the synthetic resin, and the graphite particles have a volume ratio of 5 to 50% of a volume of the sliding layer. The graphite particles are composed of spheroidal graphite particles and flake-like graphite particles. The flake-like graphite particles have a thin plate shape, and have a volume ratio of 10 to 40% of a total volume of the graphite particles. The spheroidal graphite particles have a cross-sectional structure with a plurality of AB planes of a graphite crystal laminated along a curved particle surface, from the particle surface toward a center direction. The flake-like graphite particles have a cross-sectional structure with the plurality of AB planes being laminated in a thickness direction of the thin plate shape (that is C-axis direction perpendicular to the AB plane of the graphite crystal). The spheroidal graphite particles have an average particle size of 3 to 50 µm, and the flake-like graphite particles have an average particle size of 1 to 25 µm.

In the sliding member according to the present invention, the spheroidal graphite particles mainly function as a lubricating component under a normal use state (namely at a time of a normal operation of a bearing device) when sufficient oil is fed into a gap between a sliding surface and a surface of a counterpart shaft.

In the cross-sectional (internal) structure of the spheroidal graphite particle dispersed into the sliding layer, a plurality of AB planes (hexagonal net planes) of a graphite crystal are laminated in a curved shape along a particle surface from a particle surface toward a center direction. Therefore, the surface of the spheroidal graphite particle exposed to the sliding surface of the sliding layer is configured of the AB plane of the graphite crystal.

As described above, a graphite crystal is composed of a large number of the laminated AB planes and a thickness is defined in C-axis direction which is perpendicular to the AB planes. A bonding strength (that is van der Waals force) between the laminated AB planes is much smaller than a bonding strength of in-plane direction of the AB planes, and therefore shearing easily occurs between the AB planes. When a plane formed of the AB plane of the graphite crystal is exposed to the sliding surface, the AB plane in the sliding surface contacts with a counterpart shaft. Thus, even when a load from the counterpart shaft is small, shearing easily occurs between the AB planes as a result, and a friction force between the sliding surface and the counterpart shaft surface becomes small and a degree of wear of the sliding layer is reduced.

Also, the sliding member of the present invention is prevented from generation of scratches on a surface of the counterpart shaft, when insufficient oil is fed into a gap between the sliding surface and the counterpart shaft surface immediately after a start-up of a system, mainly due to the flake-like graphite particles.

When insufficient oil is fed into a gap between the sliding surface and the counterpart shaft surface immediately after a start-up of a system, the flake graphite particles exposed to the sliding surface wear and drop off from the sliding surface by the sliding with the counterpart shaft. Since the flake graphite particles have a thin thickness, the dropped particles intrude into a gap between the sliding surface and the counterpart shaft surface. When there is no oil or very small amount of oil exists in the gap, the intruded flake graphite particles move and adhere to the counterpart shaft in a manner that a flat plate surface (AB plane) of the flake graphite particles becomes parallel to the shaft surface. The adhered flake graphite particle projects slightly to the sliding surface side of the sliding member from the shaft surface. A number of such adhered and projected particles are formed on the shaft surface, and contact with the sliding surface of the sliding member. Thus, direct contact between the intrinsic shaft surface and the spheroidal graphite particles exposed to the sliding surface of the sliding member is prevented, or frequency of the contact is reduced. As a result, generation of the scratches on the surface of the counterpart shaft is suppressed.

The flake-like graphite particles that have moved and adhered to the shaft surface are sheared off from the shaft surface by sliding against the sliding surface of the sliding member. While the oil feeding is insufficient, the flake-like graphite particles are hardly discharged to the outside from the gap between the sliding surface and the shaft surface, and thus it is supposed that the particles adhere to the shaft surface again. After sufficient oil is fed, the particles sheared off from the shaft surface are flown to the outside from the gap along with the oil.

A conventional sliding member having a sliding layer including spherical graphite particles in a synthetic resin is liable to be subject to wear when the oil feeding to the gap is insufficient immediately after the start-up of the bearing device. When the spherical graphite particles exposed to the surface slide in direct contact with the surface of the counterpart shaft, the surface of the counterpart shaft is scratched, and wear of the sliding layer is liable to occur even though sufficient oil is feed thereafter.

The spheroidal graphite particles preferably have an average particle size of 3 to 50 µm. The spheroidal graphite particles exposed to the sliding surface support a load applied from the counterpart shaft. If the average particle size is less than 3 µm, the spheroidal graphite particles exposed to the sliding surface easily drop off partially from the sliding surface during sliding, and the capacity for supporting the load is possibly lowered. When the average particle size of the spheroidal graphite particles exceeds 50 µm, scratches may be generated on the surface of the counterpart shaft during the sliding without oil feeding.

The flake-like graphite particles preferably have an average particle size of 1 to 25 µm. When the average particle size of the flake-like graphite particles is less than 1 the flake-like graphite particles are likely to agglomerate in the sliding layer, and a strength of the sliding layer may be reduced. When the average particle size of the flake-like graphite particles exceeds 25 µm, shear occurs in the flake-like graphite particles in the sliding layer by a load applied to the sliding layer during sliding, and the strength of the sliding layer may be reduced.

According to an embodiment of the present invention, the spheroidal graphite particles have an average aspect ratio A1 of 1.5 to 4.5. The average aspect ratio of the spheroidal graphite particles is defined as an average value of a ratio of a major axis to a minor axis of the spheroidal graphite particles. When the average aspect ratio A1 of the spheroidal graphite particles is not less than 1.5, a wear resistance is further improved compared with a case where the average aspect ratio A1 is less than 1.5. It is supposed that an surface area of a spheroidal graphite particle is increased and thus a contact area between the spheroidal graphite particle and the synthetic resin increases, thereby the spheroidal graphite particles hardly drops off from the sliding surface during sliding due to increase of adhering forth with the synthetic resin. More preferably, the average aspect ratio A1 of the spheroidal graphite particles is not less than 2.

Spherical graphite particles are a raw material of the spheroidal graphite particles. The spherical graphite particles are produced by repeatedly applying a small load to natural flake-like graphite particles for bending them into a spherical shape. The applied load should be made small since a large load applied to the natural flake-like graphite particles breaks the flake-like graphite particles into small flakes due to shearing between the AB planes. Accordingly, some surfaces within the spherical particle that had been surfaces of the flake-like graphite particles before granulation do not contact with each other sufficiently, and voids are likely to be formed between the surfaces that had been the flake-like graphite particle surfaces (see FIG. 5(C) of WO 2012/137770 and FIGS. 3-6 of JP-A-2008-024588).

If the spherical natural graphite particles having the voids within the particles are dispersed into a synthetic resin of the sliding member and the particles exposed to the sliding surface is subjected to a load, there is a problem that the particles crack and drop off from the sliding surface to intrude into the gap between the sliding surface and the counterpart shaft surface, thereby a damage will occurs in the sliding surface.

The spheroidal graphite particles having the average aspect ratio A1 of the present invention is produced by a following process of imparting a spheroidal shape to the spherical graphite particle as a raw material. Through the process, the voids inside the spherical graphite particles can be eliminated simultaneously. When the average aspect ratio A1 of the spheroidal graphite particles is not less than 1.5, the voids is reduced in a cross-sectional structure of the spheroidal graphite particles. When the average aspect ratio A1 is not less than 2, almost no voids can be observed in the cross-sectional structure. Thus, no cracks are generated in the spheroidal graphite particles even when the exposed particles are subjected to a load from the counterpart shaft. Therefore, prevented is the above problem that the spheroidal graphite particles drop off from the sliding surface or break and the fragments intrude into a gap between the sliding surface and the counterpart shaft surface to generate scratches on the sliding surface.

According to an embodiment of the present invention, the flake-like graphite particles have an average aspect ratio A2 of 5 to 10. The average aspect ratio of the flake-like graphite particles is defined by an average value of a ratio of a major axis to a minor axis of the flake-like graphite particles.

An anisotropic dispersion index S of the flake-like graphite particles is preferably not less than 3. The anisotropic dispersion index S is defined as an average value of a ratio X1/Y1 of each of the flake-like graphite particles. Here, X1 is a length of the flake-like graphite particle in a direction parallel to a sliding surface viewed in a cross-sectional structure perpendicular to the sliding surface of the sliding layer, and Y1 is a length of the flake-like graphite particle in a direction perpendicular to the sliding surface viewed in the cross-sectional structure perpendicular to the sliding surface of the sliding layer.

As a ratio of the flake-like graphite particles which have an orientation of their flat surface (that is a direction the AB plane extends) substantially parallel to the sliding surface is greater, the anisotropic dispersion index S increases. As described above, the flake-like graphite particles exposed to the sliding surface drop off from the sliding surface during sliding against the counterpart shaft when the oil feeding is insufficient immediately after the start-up of the system. The flake-like graphite particles have a thin plate shape having the average aspect ratio of 5 to 10, and the anisotropic dispersion index S of not less than 3, which means that a ratio of the flat plate surface thereof oriented substantially parallel to the sliding surface is great. Therefore, the flat plate surfaces of the dropping-off flake-like graphite particles are substantially parallel to the surface of the counterpart shaft, and thus the particles easily adhere to the counterpart shaft surface. More preferably, the anisotropic dispersion index S of the flake-like graphite particles is not less than 4.

According to an embodiment of the present invention, one or more selected from a group consisting of PAI (polyamideimide), PI (polyimide), PBI (polybenzimidazole), PA (polyamide), phenol, epoxy, POM (polyacetal), PEEK (polyetheretherketone), PE (polyethylene), PPS (polyphenylenesulfide) and PEI (polyetherimide) may be employed as the synthetic resin.

According to an embodiment of the present invention, the sliding layer may further include 1 to 20 volume % of one or more solid lubricants selected from a group consisting of $MoS_2$, $WS_2$, h-BN and PTFE. The solid lubricant/lubricants may improve sliding properties of the sliding layer.

According to an embodiment of the present invention, the sliding layer may further include 1 to 10 volume % of one or more fillers selected from a group consisting of $CaF_2$, $CaCO_3$, talc, mica, mullite, iron oxide, calcium phosphate and $Mo_2C$ (molybdenum carbide). The filler/fillers may improve wear resistance of the sliding layer.

According to an embodiment of the present invention, the sliding member may further include a porous metal layer between the back metal layer and the sliding layer. The porous metal layer formed on a surface of the back metal layer may contribute to increase a bonding strength between the sliding layer and the back metal layer. This is, a bonding force between the back metal layer and the sliding layer may be strengthened by an anchor effect that the resin composition of the sliding layer impregnates into pores of the porous metal layer.

The porous metal layer may be produced by sintering a metal powder of copper, a copper alloy, iron, an iron alloy or the like on a surface of a metal plate, bar or the like. Porosity of the porous metal layer may be around 20-60%. A thickness of the porous metal layer may be around 0.05 to 0.5 mm. In the case, a thickness of the sliding layer coated on a surface of the porous metal layer may be made around 0.05 to 0.4 mm. However, these dimensions are described only for an example, and the present invention is not limited to these values. It is possible to employ other dimensions.

DETAILED DESCRIPTION OF THE INVENTION

Figure 1:
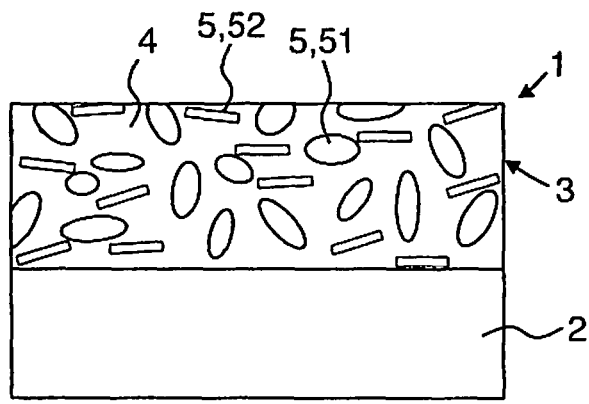
FIG. 1 is a cross-sectional view of a sliding member according to an embodiment of the present invention.

FIG. 1 schematically shows a cross-section of an embodiment of a sliding member 1 according to the present invention. The sliding member 1 includes a sliding layer 3 on a back metal layer 2. The sliding layer 3 includes a synthetic resin matrix 4 and 5 to 50 volume % of graphite particles 5. The graphite particles 5 are composed of spheroidal graphite particles 51 having a spheroidal shape and flake-like graphite particles 52 having a flake shape. A volume ratio of the flake-like graphite particles 52 to a total volume of the graphite particles 5 is 10 to 40%. In the cross-sectional (internal) structure of the spheroidal graphite particle 51, a plurality of AB planes of a graphite crystal are laminated in a curved shape along a particle surface from the particle surface toward a center, and no voids exist in the cross-sectional structure of the spheroidal graphite particles 51. In the cross-sectional structure of the flake-like graphite particles 52, a plurality of AB planes of the graphite crystal are laminated in the thickness direction of the thin plate shape (in C-axis direction that is the direction perpendicular to the AB plane of the graphite crystal). An average particle size D1 of the spheroidal graphite particle is 3 to 50 µm, and an average particle size D2 of the flake-like graphite particles is 1 to 25 µm.

Figure 4:
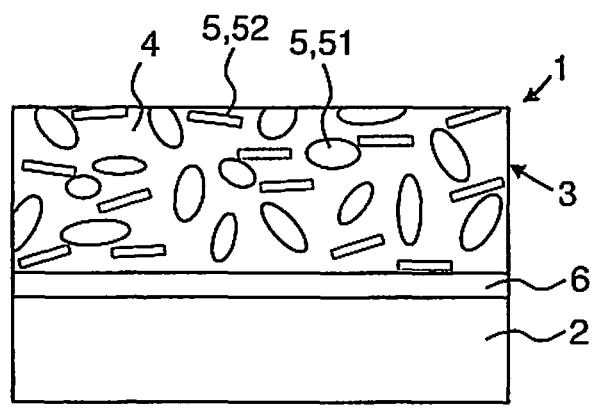
FIG. 4 is a cross-sectional view of a sliding member according to another embodiment of the present invention.

In addition, a porous metal layer 6 may be also provided between the sliding layer 3 and the back metal layer 2. The cross-section of an embodiment of the sliding member provided with the porous metal layer 6 is schematically shown in FIG. 4.

The term "spheroidal" is used herein not to mean a geometrically strict spheroidal shape, but to expresses a shape that generally elongates in one direction (namely, having the aspect ratio described below) and rounded and is not angular or irregular.

It can be measured as follows that there is no voids within the structure of the spheroidal graphite particle 51. Electron images of a plurality of spheroidal graphite particles, for example 20 particles, in the cross-section perpendicular to the sliding surface of the sliding layer 3 are taken with an electron microscope at a magnification of 2,000 times, and the images are observed to confirm that no voids are formed in the cross-sectional structure of the spheroidal graphite particles 51. However, although formation of thin linear shaped voids having a width of not more than 0.1 µm in the cross-sectional structure of the spheroidal graphite particle 51 is permitted as far as a total area ratio of such thin linear shaped voids in the cross-sectional structure of the spheroidal graphite particle 51 is limited up to 3%.

Preferably, an average aspect ratio A1 defined by an average value of a ratio of a major axis to a minor axis of the spheroidal graphite particle 51 dispersed in the sliding layer 3 is 1.5 to 4.5. On the other hand, an average aspect ratio A2 defined by an average value of a ratio of a major axis to a minor axis of the flake-like graphite particle 52 is preferably 5 to 10.

Figure 3:
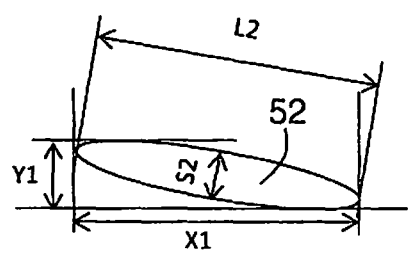
FIG. 3 is a schematic view explaining an aspect ratio A2 and an anisotropic dispersion index S of a flake-like graphite particle.

Preferably, an anisotropic dispersion index S of the flake-like graphite particles 52 is not less than 3. The anisotropic dispersion index S is defined by an average value of a ratio X1/Y1 of each of the all flake-like graphite particles, where X1 indicates a length of the flake-like graphite particle 52 in a direction parallel to a sliding surface in a cross-sectional structure perpendicular to the sliding surface of the sliding layer, and Y1 indicates a length of the flake-like graphite particle 52 in a direction perpendicular to the sliding surface in the above cross-sectional structure (see FIG. 3). Preferably, the anisotropic dispersion index S is not less than 4.

The above sliding member will be further understood referring to the following description of the producing process of the sliding member.

(1) Preparation of Raw Material Graphite Particles

As a raw material for the spheroidal graphite particles, spherical graphite particles produced by granulating from natural flake graphite particles may be used. The spherical graphite particle has a structure including a plurality of AB planes of the graphite crystal laminated in a curved shape along roundness of a particle surface from the particle surface toward the inside, but there are voids in the particle. Preferably used are spherical graphite particles, as the raw material, having an average particle size of 2 to 60 μm measured with use of a laser diffraction particle size measuring device and having a degree of circularity of not less than 0.92. Here, the degree of circularity is defined by the following expression:

Degree of Circularity=(peripheral length of a circle having the same area as that of a projected particle)/(peripheral length of the projected particle)

If the projected particle has a shape of a perfect circle, the degree of circularity is 1. The projected particle can be obtained from the photographed image with use of an optical microscope, a scanning electron microscope, or the like.

If spheroidal graphite particles with a degree of circularity of less than 0.92 are used as a raw material, a load is likely to be applied to surfaces of the graphite particles irregularly to generate local deformation of the surfaces and shearing in the mixing step for eliminating the voids described below, thereby cracks are likely to be generated inside the particles leading to new voids.

As a raw material for the flake-like graphite particles, natural flake graphite particles having a thin plate shape are used. Preferably, used are flake-like graphite particles having an average particle size of 1 to 30 μm in a direction parallel to the AB plane, and having an average thickness of 0.2 to 3.5 μm as measured with use of a laser diffraction particle size measuring devices.

(2) Preparation of Synthetic Resin Particles

It is preferable to use synthetic resin particles, as a raw material, having an average particle size of 50 to 150% of that of the spherical graphite particles. For the synthetic resin, one or more resins selected from PAI, PI, PBI, PA, phenol, epoxy, POM, PEEK, PE, PPS, and PEI may be used.

(3) Mixing

Amounts of the spherical and flake-like graphite particles are adjusted such that a volume ratio of the flake-like graphite particles is 10 to 40% of a total volume of both graphite particles. Next, amounts of the spherical and flake-like graphite particles and the synthetic resin particles are adjusted such that a volume ratio of the graphite particles is 5 to 50% of a total volume. An organic solvent is added into the spherical and flake-like graphite particles and the synthetic resin particles such that a resultant composition has a viscosity of 40,000 to 110,000 mPa·s. This solution is then mixed in a roll mill device. By the mixing, a spheroidal shape is imparted to the spherical graphite particles, and simultaneously the voids in the internal structure of the spherical graphite particles are reduced or disappeared.

The reason therefor is supposed as follows.

Conventionally, a viscosity of a solution of a resin composition including graphite and other filler particles has been typically made around 15,000 mPa·s at most. However, the viscosity of the solution of the composition is made 40,000 to 110,000 mPa·s in the process, which is higher than conventional one. Thereby, it frequently happens that the spherical graphite particle and the resin particle simultaneously pass through a gap (space) between rolls of the roll mill device during the mixing. In the case, the spherical graphite particle is deformed by a load applied on the particle. However, the load applied from the roll to the spherical graphite particle is reduced since the resin particle in contact therewith is deformed, thereby it is prevented that an excessive load is locally applied onto a surface of the spherical graphite particle, and the graphite particle can be deformed without being sheared. The graphite particle is gradually deformed and the spheroidal shape is imparted, every time the graphite particle passes through the roll gap along with the synthetic resin particle. Simultaneously, the voids inside the particle are reduced or disappeared.

It is not preferable that the viscosity of the composition exceeds 110,000 mPa·s, since an amount of the solvent is too low in the case, and the resin and spheroidal and flake-like graphite particles are hardly mixed homogeneously. In addition, the flake-like graphite particles may be broken during the mixing in the roll mill device.

The gap between the rolls of the roll mill device is adjusted to a spacing of 150% to 250% of the average particle size of the spherical graphite particles. Conventionally, the gap has been set to a significantly larger spacing in comparison with the particle size of a raw material such as resin particles and the graphite particles (for example approximately 400% of the average particle size of the graphite particles), since the mixing of a resin composition, for a sliding member, including graphite particles and other filler particles using a roll mill device is conducted merely for a purpose of mixing the particles homogeneously in an organic solvent Note that the spherical graphite particles can not be deformed, when the composition including only the spherical graphite particles in an organic solvent is subjected to the roll mill. In the case, the spherical graphite particles are sheared and cracked, and are not deformed. It is supposed that a large load is applied locally to a contacting part between the spherical graphite particles or between the spherical graphite particle and a roll surface, leading to shearing and cracking between the rolls, when the spherical graphite particle passes through the gap.

The relationship that the average particle size of the synthetic resin particles is 50 to 150% of the average particle size of the spherical graphite particles is appropriate for preventing generation of the excessive load applied to the graphite particles when passing through the gap between the rolls and generation of shearing of the particles. When a solid lubricant and a filler are further added in the sliding layer, it is preferable that an average particle size of the solid lubricant and filler particles is not larger than 50% of the average particle size of the spherical graphite particles.

The mixing of the synthetic resin and the spherical and flake-like graphite particles is not limited to the mixing with use of a roll mill device. It is also possible to use other type mixers or employ other mixing conditions.

(4) Back Metal

As a back metal layer, a metal plate of an iron alloy, copper, a copper alloy, or the like may be used. A porous metal layer may be provided on a surface of the back metal layer namely on a side to be an interface with the sliding layer. The porous metal layer and the back metal layer may have the same composition, or alternatively they may have different compositions or are made of different materials.

(5) Coating

The mixed composition is coated on one surface of the back metal layer, alternatively on the porous metal layer, if present, on the back metal layer. The back metal coated with the composition is passed through rolls having a predetermined gap in order to make a thickness of the composition uniform.

It has been found that a viscosity of the mixed composition closely relates to anisotropic dispersion of the flake-like graphite particles, namely orientation of direction of a major axis of the flake-like graphite particles in the sliding layer. It has been found important to control conditions of the coating for the anisotropic dispersion of the flake-like graphite particles.

If the viscosity of the mixed composition is too large (namely, a ratio of the organic solvent is low), the flake-like graphite particles in the composition hardly move (so that a flat surface thereof is directed parallel to the sliding surface) when the back metal layer coated with the composition passes between the rolls.

On the other hand, when the viscosity is not higher than 110,000 mPa·s, the flake-like graphite particles easily flows with the organic solvent in the coating step, and the flat surface of the flake-like graphite particles is likely to be oriented, namely dispersed anisotropically in the sliding layer of the sliding member. Specifically, when the viscosity of the composition is not higher than 110,000 mPa·s, an anisotropic dispersion index S of the flake-like graphite particles dispersed in the sliding layer becomes not less than 2.5. Furthermore, the anisotropic dispersion index becomes not less than 3 when the viscosity is not higher than 100,000 mPa·s. The anisotropic dispersion index becomes not less than 4 when the viscosity is not higher than 80,000 mPa·s.

(6) Drying/Baking

The back metal layer (or the back metal layer and the porous metal layer) coated with the composition is subjected to heating for drying the organic solvent from the composition as well as for baking the resin in the composition to produce a sliding member. The heating conditions may employ typical corresponding ones for the used resin.

(7) Measurement

An average particle size of the spheroidal graphite particles was measured by photographing an electronic image of the cross-section perpendicular to the sliding surface of the sliding member, at 200 times magnification with use of an electron microscope. Specifically, an area of each spheroidal graphite particle is measured with use of typical image analysis method (analysis software: Image-Pro Plus (Version 4.5); made by Planetron Inc.) for the obtained image. Then, an equivalent circle diameter is calculated from the area, and thus obtained equivalent circle diameters are averaged to obtain the average particle size.

An average particle size of the flake-like graphite particles is also obtained by measuring an area of each flake-like graphite particle with use of the image analysis of the image as the above. Then, an equivalent circle diameter is calculated from the area, and thus obtained equivalent circle diameters are averaged to obtain the average particle size The magnification of the electron image is not limited to 200 times, but other magnifications may be used.

Figure 2:
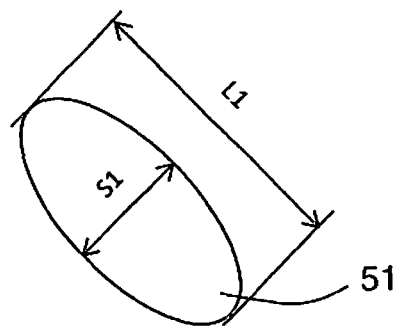
FIG. 2 is a schematic view explaining an aspect ratio A1 of a spheroidal graphite particle.

An average aspect ratio A1 of the spheroidal graphite particles is obtained as an average value of a ratio of a length L1 of a major axis to a length S1 of a minor axis (i.e. (length L1 of major axis)/(length S1 of minor axis)) of each spheroidal graphite particle with use of the image analysis of the electron image obtained as described above (see FIG. 2). Here, the length L1 of the major axis of the spheroidal graphite particle is defined as a maximum length of the spheroidal graphite particle observed in the above electron image, and the length S1 of the minor axis is defined as a longest length parallel to the minor axis which is perpendicular to the major axis.

An average aspect ratio A2 of the flake-like graphite particles is obtained as an average value of a ratio of a length L2 of a major axis to a length S2 of a minor axis (i.e. (length L2 of major axis)/(length S2 of minor axis)) of each flake-like graphite particle with use of the image analysis of the electron image obtained as described above (see FIG. 3). Here, the length L2 of the major axis of the flake-like graphite particles is defined as a maximum length of the flake-like graphite particle observed in the above electron image, and the length S2 of the minor axis is defined as a longest length parallel to the minor axis which is perpendicular to the major axis.

It was confirmed as follows that the spheroidal graphite particle has a cross-sectional structure where a plurality of AB planes of the graphite crystal were laminated in a curved shape along a roundness of a particle surface from the particle surface toward a center direction. Electron images were taken with 2,000 times magnification with use of an electron microscope for a plurality of the spheroidal graphite particles (20 particles for example) in the cross-section perpendicular to the sliding surface of the sliding member, and the photographed images were observed to confirm that laminating layers along a roundness of the particle surface was formed from the particle surface toward the center direction.

As described above, spherical natural graphite particles were used as a raw material and were subjected to a process of eliminating voids in the internal structure of the graphite particles in the mixing step. Nevertheless, there was a case that a part of the spheroidal graphite particles include thin linear shaped voids having a width of not greater than 0.1 μm (i.e. a width perpendicular to the AB plane of the graphite crystal in the structure) with a total area ration of not more than 3% of a cross-sectional structure of the particle when observed as described above. However, the spheroidal graphite particles having such thin linear shaped voids have the same sliding properties as that of the spheroidal graphite particles without voids.

It was confirmed that the flake-like graphite particles has a cross-sectional structure including a plurality of AB planes of the graphite crystal laminated in a thickness direction of a thin plate (i.e. a C-axis direction perpendicular to the AB plane of the graphite crystal) as follows. Electron images were taken at 2,000 times magnification with use of an electron microscope for a plurality of the flake-like graphite particles (20 particles for example) of the cross-section perpendicular to the sliding surface of the sliding member, and the photographed images were observed to confirm that laminating layers were formed in the thickness direction of the thin plate.

The anisotropic dispersion index S of the flake-like graphite particles 52 was obtained as follows. A length X1 in the direction parallel to the sliding surface of each flake-like graphite particle 52 in the sliding layer and a length Y1 in the direction perpendicular to the sliding surface were measured by the image analysis described above for electron images taken at 200 times magnification with use of an electron microscope in the cross-section perpendicular to the sliding surface of the sliding member, and an average value of a ratio X1/Y1 of the lengths (see FIG. 3) was calculated.

EXAMPLES

Examples 1 to 10 of the sliding member including the back metal layer and the sliding layer according to the present invention and Comparative Examples 11 to 17 were produced as follows. Compositions of the sliding layers of the sliding members of Examples 1 to 10 and Comparative Examples 11 to 17 are as shown in Table 1.

thus the particles have a thin plate shape. The flake-like graphite particles do not include a void in the cross-sectional structure.

When the spherical graphite particles were used as a raw material, synthetic resin (PAI, PI) particles as a raw material were used which have an average particle size that is 125% of an average particle size of the spherical graphite particles. In Comparative Example 12, a raw material was the flake-like graphite particles. In the case, synthetic resin particles as a raw material were used which have a particle size that is 125% of an average particle size of the flake-like graphite particles. For solid lubricant ($MoS_2$, PTFE) used as a raw material of Examples 5 to 7, those having an average particle size that is 30% of the average particle size of the spherical graphite particles were used as a raw material. For filler ($CaCO_3$), those having an average particle size that is 25% of the average particle size of the spherical graphite particles were used.

The compositions shown in Table 1 composed of the above raw materials were solved by an organic solvent to have a viscosity as shown in the column "viscosity (mPa·s)" of Table 1. The compositions were then subjected to a mixing process in a roll mill device for one hour, in which mixing and eliminating of internal voids of the spherical graphite particles were conducted simultaneously. A gap

TABLE 1

| Sample | | Composition (volume %) | | | | | | Graphite | | | | | | Evaluation | |
|---|---|---|---|---|---|---|---|---|---|---|---|---|---|---|---|
| | | | | | | | | Spheroidal graphite particle | | Flake-like graphite particle | | | | | |
| | | Graphite | PAI | PI | MoS2 | PTFE | CaCO3 | Average particle size (μm) | Aspect ratio (A1) | Average particle size (μm) | Aspect ratio (A2) | Anisotropic dispersion index (S) | Ratio (volume %) | Viscosity (mPa·s) | Presence/Absence of scratch | Wear amount (μm) |
| Example | 1 | 5 | 95 | — | — | — | — | 50 | 1.3 | 25 | 12.5 | 11.6 | 40 | 40,000 | absence | 6.1 |
| | 2 | 25 | 75 | — | — | — | — | 25 | 1.4 | 15 | 7.6 | 5.8 | 25 | 40,000 | absence | 5.2 |
| | 3 | 50 | 50 | — | — | — | — | 3 | 1.4 | 1 | 11.2 | 9.7 | 10 | 40,000 | absence | 4.8 |
| | 4 | 25 | 75 | — | — | — | — | 25 | 1.5 | 10 | 5.1 | 4.6 | 25 | 45,000 | absence | 3.1 |
| | 5 | 15 | 70 | — | 10 | 5 | — | 25 | 2.0 | 20 | 9.9 | 7.8 | 20 | 55,000 | absence | 2.8 |
| | 6 | 20 | 65 | — | 10 | — | 5 | 25 | 2.7 | 15 | 7.3 | 4.6 | 20 | 70,000 | absence | 2.2 |
| | 7 | 30 | 60 | — | — | 10 | — | 25 | 3.3 | 15 | 7.6 | 4.0 | 25 | 80,000 | absence | 2.9 |
| | 8 | 30 | 70 | — | — | — | — | 25 | 4.0 | 15 | 7.7 | 3.6 | 30 | 90,000 | absence | 3.5 |
| | 9 | 25 | — | 75 | — | — | — | 25 | 4.5 | 15 | 7.6 | 3.1 | 25 | 100,000 | absence | 2.4 |
| | 10 | 25 | — | 75 | — | — | — | 25 | 4.7 | 15 | 4.0 | 2.6 | 25 | 110,000 | absence | 6.5 |
| Comparative example | 11 | 25 | 75 | — | — | — | — | 25 | 1.1 | — | — | — | 0 | 15,000 | presence | 25.0 |
| | 12 | 25 | 75 | — | — | — | — | — | — | 15 | 7.7 | 6.2 | 100 | 15,000 | presence | 25.8 |
| | 13 | 50 | 50 | — | — | — | — | 3 | 1.4 | 1 | 10.9 | 9.5 | 5 | 40,000 | presence | 20.4 |
| | 14 | 5 | 95 | — | — | — | — | 50 | 1.3 | 25 | 12.3 | 11.4 | 45 | 40,000 | absence | 17.8 |
| | 15 | 3 | 97 | — | — | — | — | 25 | 1.4 | 15 | 7.6 | 5.9 | 25 | 40,000 | absence | 14.1 |
| | 16 | 60 | 40 | — | — | — | — | 25 | 1.4 | 15 | 7.7 | 5.6 | 25 | 40,000 | absence | 12.3 |
| | 17 | 50 | 50 | — | — | — | — | 25 | 1.4 | — | — | — | 0 | 40,000 | presence | 22.2 |

The spherical graphite particles used as a raw material were granulated from flake natural graphite into a spherical shape. In the structure of the particles, a plurality of AB planes of the graphite crystal were laminated in a curved shape along a roundness of a particle surface from the particle surface toward the inside, and there were voids of approximately 10% in the particle.

The flake-like graphite particles used as a raw material has a structure composed of a number of planar shaped AB planes laminated defining a thickness in the C-axis direction which is perpendicular to the AB plane. The thickness of laminates is smaller than the extension of the AB plane, and between rolls of the roll mill device was made become 200% of the average particle size of the spherical graphite particles as a raw material for Examples 1 to 10 and Comparative Examples 11 and 13 to 17. The gap was made to be 400% of the average particle size of the flake-like graphite particles as a raw material for Comparative Example 12.

Next, each mixed composition was applied on one surface of a back metal layer made of an iron alloy, and was passed between rolls to coat the composition with a predetermined thickness. While the iron alloy is used as the back metal layer for Examples 1 to 9 and Comparative Examples 11 to 17, the iron alloy having a porous sintered copper alloy thereon was used for Example 10.

Finally, heating for drying the solvent from the compositions and for baking the synthetic resin were conducted. Thus, sliding members were produced. A thickness of the sliding layer of the sliding member was 0.3 mm, and that of the back metal layer was 1.7 mm for the produced Examples 1 to 10 and Comparative Examples 11 to 17.

An average particle size of the spheroidal graphite particles dispersed in the sliding layer of each example of the sliding member was measured by the above method, and the result is shown in the column "Average particle size" of Table 1. As well, an average aspect ratio (A1) of the spheroidal graphite particles was measured described above, and the result is shown in the column "Aspect ratio (A1)" of Table 1. Comparative Examples 11 and 13 to 17 were also measured of the average particle size and the average aspect ratio (A1) and the results are shown in Table 1.

An average particle size of the flake-like graphite particles dispersed in the sliding layer of each example of the sliding member was measured by the above method, and the result is shown in the column "Average particle size" of Table 1. As well, an average aspect ratio (A2) and an anisotropic dispersion index (S) of the flake-like graphite particles 52 were measured as described above, and the results are shown in the columns "Aspect ratio (A2)" and "Anisotropic dispersion index (S)" of Table 1. Comparative Examples 12 to 17 were also measured of the average particle size, the average aspect ratio (A2) and the anisotropic dispersion index (S) and the results are shown in Table 1.

Each member of the examples and the comparative examples was formed into a cylindrical shape with the sliding layer being an inner side. A sliding test was conducted for each member in conditions shown in Table 2. An amount of wear after the sliding test of the sliding layer is shown in the column "Wear amount" of Table 1. As well, generation of a scratch on a surface of a counterpart shaft after the sliding test was evaluated with use of a roughness gauge in a plurality of locations of the surface for each example and each comparative example. When a scratch having a depth of not lower than 2 μm was measured on the surface of the counterpart shaft, it was judged to have generated a scratch ("presence"). Otherwise, it was judged that no scratch has generated ("absence"). The results are marked as "presence" or "absence" in the column "Presence/Absence of scratch" of Table 1.

TABLE 2

| Testing machine | Bearing tester |
|---|---|
| Load | 20 MPa |
| Sliding speed | 1.5 m/second |
| Operating mode | Sliding (without lubrication) for 1 minute → sliding (with lubricated) for 4 minutes →stop (without lubrication) for 10 minutes |
| Number of cycle | 25 cycles |
| Bearing size | Outer diameter 29 mm * inner diameter 25 mm * width 15 mm |
| Bearing gap | 30 μm |
| Oil | SAE 10 equivalent |
| Fed oil temperature | 70° C. |
| Counterpart shaft | S45C |
| Roughness of counterpart shaft | 0.2 Ra |

As seen from the result of Table 1, the wear of the sliding layer of Examples 1 to 10 after the sliding test were smaller than those of Comparative Examples 11 to 17. In particular, Examples 4 to 9 were especially small in wear, since they have 1.5 to 4.5 of the average aspect ratio A1 of the spheroidal graphite particle 51, not less than 5 of the average aspect ratio A2 of the flake-like graphite particles 52, and not less than 3 of the anisotropic dispersion index S. Examples 4 to 9 with an aspect ratio A1 of the spheroidal graphite particle of not less than 1.5 have smaller amount of wear than that of Examples 1 to 3 with aspect ratio A1 of less than 1.5. It is supposed that the spheroidal graphite particles of Examples 4 to 9 have an larger surface area and an contact area with the synthetic resin is increased, thereby more strongly supported by the synthetic resin.

Furthermore, no scratches were generated on the surface of the counterpart shaft after the sliding test in Examples 1 to 10. This also relates to the reduced amount of wear. The reason why generation of the scratch on the surface of the counterpart shaft is suppressed in Examples 1 to 10 is because the sliding layer includes the spheroidal graphite particles and the flake-like graphite particles as described above.

On the other hand, when the sliding layer includes only the spheroidal graphite particles as Comparative Examples 11 and 17, the spheroidal graphite particles exposed to the sliding surface directly contact with the counterpart shaft and slide when a lubricant is not supplied, and thus the scratch generates on a surface of a counterpart shaft. Once the scratch is generated on the surface of the counterpart shaft, the sliding layer is liable to be worn even though the lubricant is then supplied, and thus an amount of wear increases.

The spheroidal graphite particles in Examples 1 to 4 included partially thin linear shape voids with a width of not greater than 0.1 μm along a laminated structure of a graphite crystal at not more than 3% area ratio of a total area of the spheroidal graphite particle including the voids. In these examples, however, no spheroidal graphite particles dropped off from the sliding surface after the sliding test, and no scratch was generated on the surface of the counterpart shaft.

In Comparative example 11, the spheroidal graphite particles exposed to the sliding surface contact directly with the counterpart shaft and slide with each other when a lubricant is not supplied, and a scratch is generated on the surface of the counterpart shaft as described above. While the spherical graphite particles including voids inside the particles were used as a raw material, a composition including the graphite particles was diluted by an organic solvent so that the viscosity became 15,000 mPa·s, and thus a ratio of the organic solvent was high. Thus, the synthetic resin particles and the spherical graphite particles pass through a gap between rolls of a roll mill device in the mixing step at a low a frequency. Therefore, the spherical graphite particles as a raw material deform in a small amount in the mixing step. As a result, the average aspect ratio (A1) of the spheroidal graphite particles dispersed in the sliding layer became smaller, and the voids inside of the particles in the cross-sectional structure remained substantially as they were. Accordingly, when the graphite particles exposed to the surface of the sliding layer of Comparative Example 11 received a load from the surface of the counterpart shaft in the sliding test in both cases where the lubricant was supplied and not, it is supposed that a crack occurred in the spheroidal graphite particles and the internal voids were crushed to cause buckling, and thus the surface area of the particles was reduced and supporting forth of the spheroidal graphite particle by the synthetic resin became insufficient. Thereby, sheared pieces of the spheroidal graphite particles dropped off from the sliding surface and intruded into spaces between the surface between the sliding surface and the counterpart shaft, and thus wear of the sliding surface was facilitated.

In Comparative Example 12, the sliding layer includes only the flake-like graphite particles, that is different from the examples of Table 1. The reason why an amount of wear of the sliding layer increased in Comparative Example 12 is supposed as follows.

Since the sliding layer of Comparative Example 12 included only the flake-like graphite particles, a more amount of the flake-like graphite particles are exposed to the sliding surface than the Examples. Therefore, flake-like graphite particles dropping off from the sliding surface to the space between the sliding surface and the surface of the counterpart shaft are increased too much when a lubricant was not supplied, and the dropped flake-like graphite particles generate a scratch on the surface of the counterpart shaft, leading to the increased amount of wear of the sliding layer.

In addition, since a large amount of the flake-like graphite particles were exposed to the sliding surface, the amount of the dropped flake-like graphite particles increased even when the lubricant was supplied. Thus, formation of an oil film between the surface of the counterpart shaft and the sliding surface was suppressed due to existence of the dropped flake-like graphite particles, thereby the amount of wear of the sliding layer increased.

The sliding layer of Comparative Example 13 includes both the spheroidal graphite particles and the flake-like graphite particles. However, a volume ratio of the flake-like graphite particles to a total volume of the graphite particles included in the sliding layer was 5% and the ratio was too low. Thus, formation of the moving and adhering part of the flake-like graphite particles to the surface of the counterpart shaft when the lubricant was not supplied became insufficient, and a scratch was generated on the surface of the counterpart shaft. Therefore, the amount of wear of the sliding layer increased.

The sliding layer of Comparative Example 14 includes both the spheroidal graphite particles and the flake-like graphite particles. However, a volume ratio of the flake-like graphite particles to a total volume of the graphite particles included in the sliding layer was 45% and the ratio was too large. Thus, an large amount of the flake-like graphite particles exposed to the sliding layer broke and dropped off when the lubricant was supplied, and formation of an oil film between the surface of the counterpart shaft and the sliding surface was suppressed by the dropped flake-like graphite particles, thereby the amount of wear of the sliding layer increased.

In Comparative Example 15, an amount of graphite particles including the spheroidal and the flake-like graphite particles in the sliding layer was 3 volume %. Since the ratio was low, an effect of reducing a friction between the sliding layer and the surface of the counterpart shaft became insufficient, and the amount of wear of the sliding layer increased.

In Comparative Example 16, an amount of graphite particle including the spheroidal graphite particles and the flake-like graphite particles in the sliding layer was 60 volume %. Since the ratio was great, a strength of the sliding layer was reduced, and the amount of wear of the sliding layer increased.

The invention claimed is:

1. A sliding member comprising:
   a back metal layer; and
   a sliding layer on the back metal layer, the sliding layer comprising a synthetic resin matrix and graphite particles dispersed in the synthetic resin matrix, the graphite particles having a volume ratio of 5 to 50% of a volume of the sliding layer,
   wherein the graphite particles include spheroidal graphite particles and flake-like graphite particles having a thin plate shape, the flake-like graphite particles having a volume ratio of 10 to 40% of a total volume of the graphite particles,
   wherein the spheroidal graphite particles have a cross-sectional structure in which a plurality of AB planes of a graphite crystal are laminated along a curved particle surface, from the particle surface toward a center direction,
   wherein the flake-like graphite particles have a cross-sectional structure in which the plurality of AB planes are laminated in a thickness direction of the thin plate shape,
   wherein the spheroidal graphite particles have an average particle size of 3 to 50 µm, and the flake-like graphite particles have an average particle size of 1 to 25 µm,
   wherein the spheroidal graphite particles have an average aspect ratio of 1.5 to 4.5,
   wherein the flake-like graphite particles have an average aspect ratio of 5 to 10, and
   wherein an anisotropic dispersion index of the flake-like graphite particles is not less than 3, the anisotropic dispersion index being defined as an average value of a ratio X1/Y1 of each of the flake-like graphite particles, where
   X1 is defined as a length of each flake-like graphite particle in a direction parallel to a sliding surface when viewed in a cross-sectional structure perpendicular to the sliding surface of the sliding layer, and
   Y1 is defined as a length of each flake-like graphite particle in a direction perpendicular to the sliding surface when viewed in the cross-sectional structure perpendicular to the sliding surface of the sliding layer.

2. The sliding member according to claim 1, wherein the synthetic resin matrix is made of one or more synthetic resins selected from a group consisting of PAI, PI, PBI, PA, phenol, epoxy, POM, PEEK, PE, PPS and PEI.

3. The sliding member according to claim 1, wherein the sliding layer further comprises 1 to 20 volume % of one or more solid lubricants selected from a group consisting of $MoS_2$, $WS_2$, h-BN and PTFE.

4. The sliding member according to claim 1, wherein the sliding layer further comprises 1 to 10 volume % of one or more fillers selected from a group consisting of $CaF_2$, $CaCO_3$, talc, mica, mullite, iron oxide, calcium phosphate and $Mo_2C$.

5. The sliding member according to claim 1, further comprising a porous metal layer between the back metal layer and the sliding layer.

* * * * *